United States Patent [19]

Ehrlinger et al.

[11] 4,418,785
[45] Dec. 6, 1983

[54] STEERED AND DRIVEN AXLE-END ASSEMBLY

[75] Inventors: Friedrich Ehrlinger, Friedrichshafen; Peter Dziuba, Ueberlingen; Dieter Maurer; Manfred Goeft, both of Friedrichshafen, all of Fed. Rep. of Germany

[73] Assignee: Zahnradfabrik Friedrichshafen Aktiengesellschaft, Friedrichshafen, Fed. Rep. of Germany

[21] Appl. No.: 172,280

[22] Filed: Jul. 25, 1980

[30] Foreign Application Priority Data

Jul. 26, 1979 [DE] Fed. Rep. of Germany ....... 2930298

[51] Int. Cl.³ .......................................... B60K 17/30
[52] U.S. Cl. ................................... 180/255; 180/254; 180/258
[58] Field of Search ............... 180/254, 255, 258, 259, 180/263; 74/390

[56] References Cited

U.S. PATENT DOCUMENTS

| 1,922,962 | 8/1933 | Lambert | 180/254 |
| 2,801,702 | 8/1957 | Armington | 180/255 |
| 2,858,897 | 11/1958 | Sibley | 180/259 |
| 3,420,327 | 1/1969 | Nallinger et al. | 180/255 |
| 4,258,818 | 3/1981 | Uzu | 180/25 |

FOREIGN PATENT DOCUMENTS

| 2033271 | 9/1973 | Fed. Rep. of Germany. | |
| 2054492A | 2/1981 | United Kingdom | 180/255 |

Primary Examiner—Joseph F. Peters, Jr.
Assistant Examiner—Donn McGiehan
Attorney, Agent, or Firm—Karl F. Ross; Herbert Dubno

[57] ABSTRACT

A steered and driven axle-end assembly has a steering knuckle whose inside and outside halves are pivotal about an upright pivot axis. An axle extends into the inside knuckle half and is connected to the inner side of a universal joint whose outer side is connected to one end of a gear train whose other end is connected to a wheel support which is rotatable about a horizontal wheel axis on the outside knuckle half. A pair of roller bearings centered on the wheel axis are spaced axially apart therealong by a spacing which is equal to at most half of the axial distance through which the outside knuckle half extends into the wheel support. Thus the outside knuckle half and associated structure can pivot through a considerable angle relative to the inside knuckle half for minimum turning radius of a vehicle embodying the axle-end assembly.

1 Claim, 3 Drawing Figures

STEERED AND DRIVEN AXLE-END ASSEMBLY

FIELD OF THE INVENTION

The present invention relates to a steered and driven axle-end assembly. More particularly this invention concerns such an assembly used in heavy-duty, off-the-road, and construction equipment.

BACKGROUND OF THE INVENTION

A steered and driven axle-end assembly normally has a knuckle formed of inside and outside knuckle halves pivotal relative to each other about an upright pivot axis, the inside knuckle half being mounted rigidly on the frame of the vehicle.

An exle extends into the inside knuckle half and is connected there to the inner side of a universal joint whose outer side is connected to a wheel support that is rotatable about a horizontal wheel axis by means of roller bearings that support it on the outer knuckle half. Thus it is possible for the outside knuckle half to pivot with the wheel carried on the wheel support relative to the inside half while rotary force is still transmitted through the universal joint, which is normally of the constant-speed type, to the wheel.

In heavy-duty construction equipment it is desirable to provide the wheel brake inboard of the wheel on the axle. This is made possible by providing stepdown gearing between the outside joint half and the rotatable wheel support. The axle therefore rotates at a considerably greater angular rate than the wheel so that brakes suitable for high speed and low torque can be employed, thereby saving considerable expense. This type of arrangement also has the advantage that the bearings and the like that support the axle or drive shaft can also be of the high-speed low-torque type which is considerably cheaper to manufacture and which has longer service life than the type adapted for low-speed high-torque use.

The main disadvantage of these systems, however, is that they are relatively bulky. The distance between the knuckle and the wheel is relatively great so that quite a bit of mechanism is exposed under the vehicle at each wheel. In construction equipment this disadvantage is very great in that this mechanism is exposed to damage from the rough terrain on which the vehicle rides.

Another considerable disadvantage of such an arrangement is that its axial length, measured along the horizontal wheel axis, is so great that the wheel can only be cramped through a relatively limited arc from one end to the other of its travel about the upright pivot axis defined by the knuckle. The turning radius for the vehicle is therefore relatively large, another disadvantage in construction equipment which must normally be as maneuverable as possible.

OBJECTS OF THE INVENTION

It is therefore an object of the present invention to provide an improved steered and driven axle-end assembly.

Another object is to provide such an assembly which is of minimum dimensions so that it not only does not project axially inwardly from the wheel where it would be exposed and subject to damage, but also allows the wheel to be cramped greatly in either direction for a minimum turning radius.

SUMMARY OF THE INVENTION

These objects are attained according to the instant invention in an arrangement wherein the support distance, which is the distance along the axis between the intersections of the contact angles of the two roller bearings carrying the wheel support on the outside knuckle half, is at least twice as large as the axial spacing between the center of the roller bearings that support the wheel support on the outer knuckle half. As a result of this construction a relatively small turning radius is possible for the vehicle embodying the inventive axle-end assembly. A relatively large tractor, for example, having large front wheels can have a substantially smaller turning radius with the axle-end assembly according to this invention than has hitherto been possible. Furthermore almost the entire assembly can fit within the axial boundaries of the wheel, so that it is well protected from harm, a considerable advantage in heavy-duty construction equipment.

Yet another advantage of the system according to this invention is that, due to its reduced axial length, the pivot axis defined by the knuckle halves is very close to the upright central wheel plane. In fact this axis crosses the plane radially within the periphery of the wheel, intersecting the ground outside the wheel's central plane. Steering ease is therefore greatly improved.

According to further features of this invention the gearing is planetary gearing and includes a ring gear fixed on the outside knuckle half, a sun gear fixed on the outer side of the universal joint, at least one planet gear meshing with the sun and ring gears, and a planet-carrier pin carrying the planet gear and fixed on the wheel support. With such a system the drive axle is coaxial with the wheel axis and the wheel hub carries the planet-carrier pin. Normally several such planet gears and planet-carrier pins are provided equiangularly surrounding the sun gear so that this sun gear need only be supported adjacent the outer side of the universal joint, the various planet gears automatically centering it. Such a planetary-type stepdown transmission gives a considerable stepdown ratio while being extremely compact.

It is also within the scope of this invention to employ a portal-type arrangement wherein the axle axis lies well above the wheel axis for machinery such as a road grader or the like. In this arrangement the gearing includes a large-diameter driven gear fixed on the support and centered on the wheel axis and a small-diameter drive gear which is fixed on the outer side of the universal joint. Although this drive gear can mesh externally directly with the large gear, according to this invention it meshes with a pair of flanking gears which both mesh with the large gear. Thus once again the small-diameter drive pinion is automatically centered between the flanking gears so that heavy-duty bearings are not needed to support it. Furthermore a double stepdown is achieved with this type of arrangement in an extremely compact space within the motor-vehicle wheel.

SPECIFIC DESCRIPTION

Figure 1:
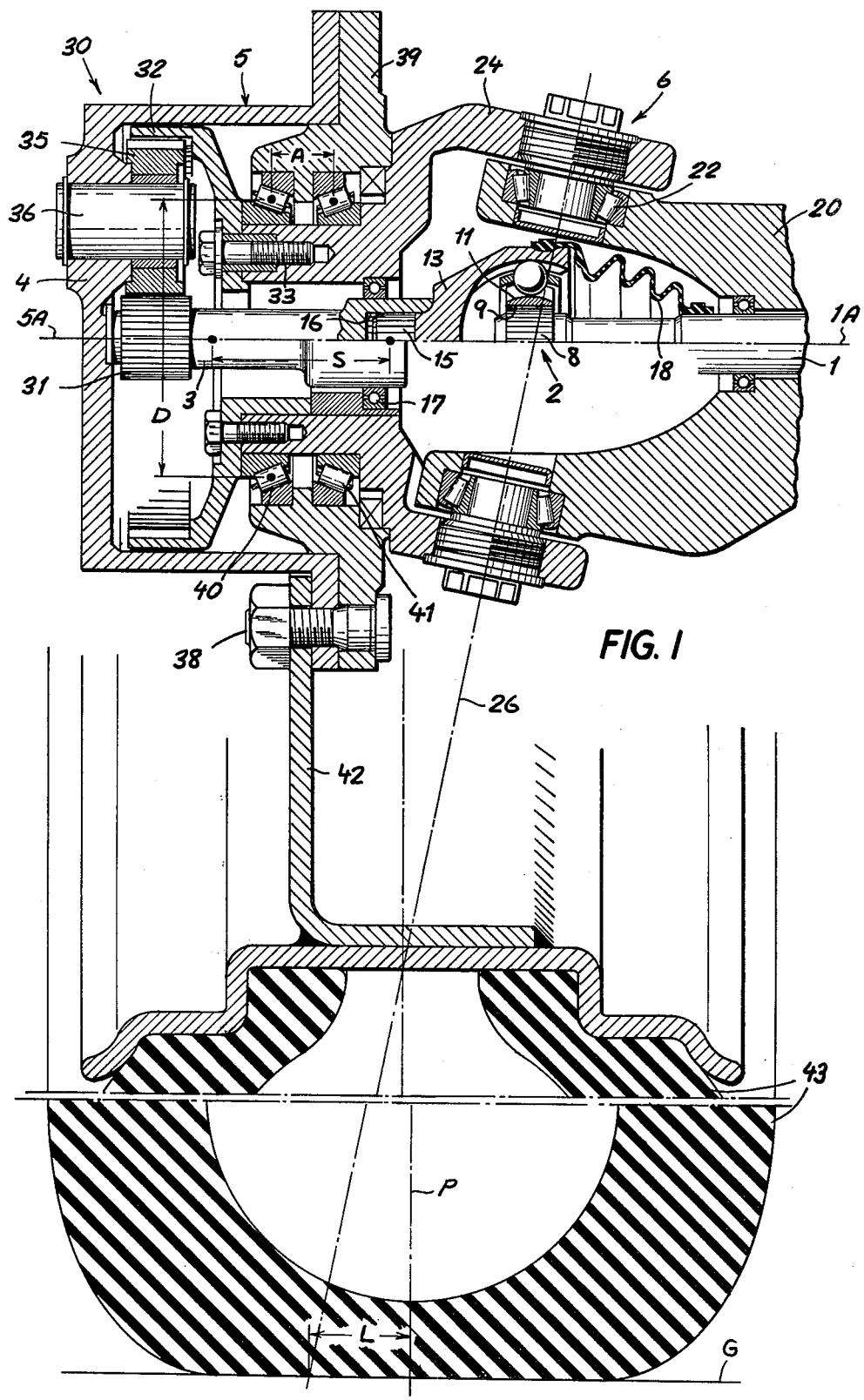
FIGS. 1 and 2 are vertical sections through axle-end assemblies according to to this invention.

As seen in FIG. 1 an axle 1 centered on an axis 1A extends into the inside half 20 of a knuckle joint 6 defining a pivot axis 26 and having an outside knuckle half 24 supported on bearings 22 in this inner half 20 for pivoting about the axis 26. The axle 1 has splines 8 interfitting with splines 9 on one side 11 of a constant-speed universal joint 2 having an outer side 13 provided with splines 15 interfitting with splines 16 on a stub shaft 3 supported at its inner end on a bearing 17 in the outside knuckle half 24. A wheel support 5 centered on a wheel axis 5A is formed by a hub 4 and a plate 39 secured together by stud-type bolts 38 that also serve to secure the rim 42 of a wheel carried by the wheel support 5 and having a tire 43. A cuff 18 is provided between the shaft 1 and the outside half 13 for protecting the joint 2 from dust.

Inclined cylindrical-roller bearings 40 and 41 having diameters D and having centers spaced apart by a distance A support the wheel support 5 on the outside knuckle half 24 for rotation about the axis 5A. The contact angles of the bearings 40 and 41, which are arranged back to back, intersect the axis 5A at points spaced apart by a distance S equal to somewhat more than twice the spacing A, which itself is equal to at most one-third of the diameter D.

Secured via bolts 33 to the outer face of the knuckle half 24 is a ring gear 32 meshing with three angularly equispaced planet gears 35 (only one visible in FIG. 1) carried on respective planets pins 36 seated in the hub 4 which, therefore, constitutes a planet carrier. The stub shaft 3 carries on its free outer end a sun gear 31 meshing with the planet gears 35 and forming therewith and with the gear 32 a planetary-gear transmission 30.

Thus the rotation of the axle 1 will be transmitted through the joint 2 to the small-diameter sun gear 31 whence it will be transmitted to the planet gears 35 that will, therefore, orbit about within the fixed ring gear 32, imparting a considerable stepdown to the rotation rate of the axle 1. As a result of the above-described relationship between the dimensions A, D and S the axis 26 cuts the middle plane P of the wheel 42, 43 carried on the support 5 above the ground level G so that at the ground level the axis 26 is spaced outwardly from this plane P by a distance L. Extremely good handling is therefore obtained. FIG. 1 also shows how the universal joint 2, outer knuckle half 24, and wheel support 5 lie wholly within the vertical projection of the wheel 42, 43, that is within the axial boundaries of this wheel 42, 43.

Figures 2, 3:
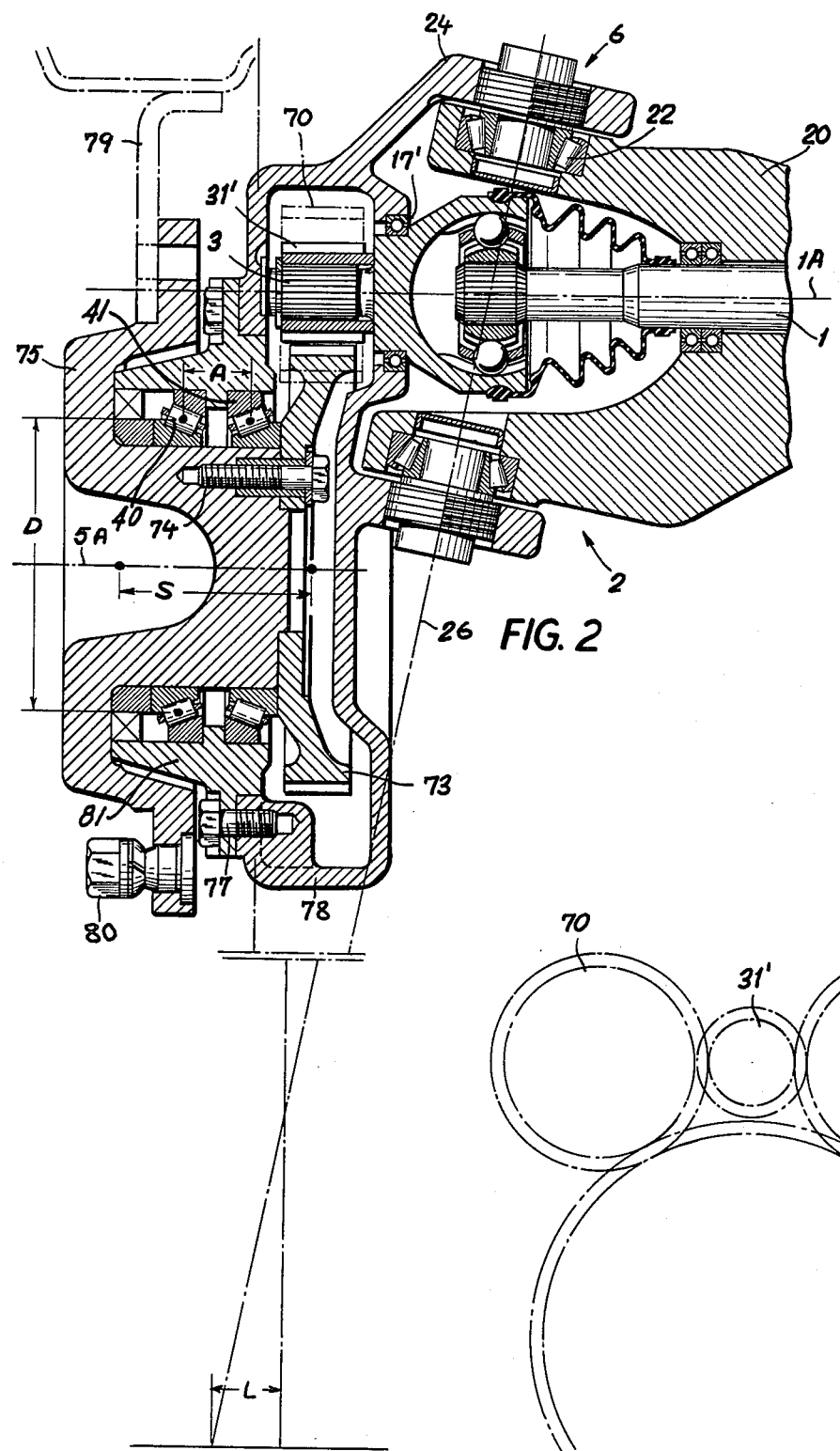
FIG. 3 is a schematic end view illustrating the system of FIG. 2.

In the arrangement of FIGS. 2 and 3 reference numerals identical to those of FIG. 1 refer to functionally identical structure. In this arrangement the axis 1A lies well above the axis 5A for use of this arrangement in a road grader or the like wherein very high ground clearance is needed. This is achieved by mounting on the outer side of the universal joint 2 a small-diameter pinion 31' that is flanked by and meshes with a pair of medium-diameter gears 70 and 71 in turn meshing with a large-diameter driven gear 73 secured via bolts 74 to a massive hub 75. This hub 75 rides via the bearings 40 and 41 on a ring 81 is in turn secured via bolts 77 to an element 78 integral with the outer knuckle half 24. A wheel 79 is secured via bolts 80 to this wheel hub 75.

As a result of this floating mounting of the pinion 31' between the gears 70 and 71 it need only be supported on one side at a relatively light-duty bearing 17'. Nonetheless once the high-speed rotation of the gear 31' is stepped down by the gears 70 and 71 and the gear 73 the output torque for rotation of the wheel hub 75 about the axis 5A will be considerable.

We claim:
1. A steered and driven axle-end assembly comprising:
   an inside knuckle half;
   an outside knuckle half pivotal on said inside half about an upright pivot axis;
   an axle extending into said inside knuckle half;
   a universal joint having an inner side connected in said inside knuckle half to said axle and an outer side;
   a wheel support rotatable about a horizontal wheel axis;
   a wheel mounted on said support and having a periphery engageable with the ground and centered on a wheel plane perpendicular to said wheel axis, said pivot axis crossing said plane radially within said periphery;
   a pair of tapered-roller bearings centered on said wheel axis and having centers spaced axially apart therealong by a spacing equal to at most half of the axial distance between the intersections of their contact angles and said wheel axis, said roller bearings rotatably supporting said wheel support on said outer knuckle half; and
   stepdown gearing connecting said outer side of said universal joint to said wheel support for rotation of said wheel support and said wheel by said axle at a substantially lower rate than said axle, said universal joint, outside knuckle half, and wheel support lying wholly within the vertical projection of said wheel, said gearing including:
   a large-diameter driven gear fixed on said support and centered on said axis and a small-diameter drive gear fixed on said outer side of said universal joint, and
   two further gears flanking said small gear and both meshing with said small gear and with said large gear, whereby said small gear meshes via said further gears with said large gear.

* * * * *